(12) United States Patent
Shih

(10) Patent No.: US 6,793,294 B2
(45) Date of Patent: Sep. 21, 2004

(54) WHEEL ASSEMBLY WITH SPOKE-COVERING MEMBERS

(75) Inventor: Steven Shih, Taichung Hsien (TW)

(73) Assignee: Giant Manufacturing Co., Ltd., Taichung Hsien (TW)

(*) Notice: Subject to any disclaimer, the term of this patent is extended or adjusted under 35 U.S.C. 154(b) by 0 days.

(21) Appl. No.: 10/274,984

(22) Filed: Oct. 22, 2002

(65) Prior Publication Data

US 2004/0075333 A1 Apr. 22, 2004

(51) Int. Cl.[7] .............................. B60B 7/04; B60B 7/14
(52) U.S. Cl. ............................. 301/37.41; 301/37.105
(58) Field of Search ......................... 301/37.61, 37.102, 301/37.41, 37.29, 37.105, 37.106, 37.42

(56) References Cited

U.S. PATENT DOCUMENTS

| | | | | |
|---|---|---|---|---|
| 1,390,425 A | * | 9/1921 | Blair | |
| 1,987,223 A | * | 1/1935 | Zerk | |
| 3,004,798 A | * | 10/1961 | Tylle | |
| 3,317,246 A | * | 5/1967 | Wester | |
| 3,390,917 A | * | 7/1968 | Tilighman et al. | |
| 3,567,285 A | * | 3/1971 | Faurot | 301/37.42 |
| 5,131,727 A | * | 7/1992 | Johnson | |
| 5,551,763 A | * | 9/1996 | Alsman | |
| 5,782,540 A | * | 7/1998 | Camfield et al. | |

* cited by examiner

Primary Examiner—Russell D. Stormer
(74) Attorney, Agent, or Firm—Harness, Dickey & Pierce, P.L.C.

(57) ABSTRACT

A wheel assembly includes a wheel rim, a hub radially spaced from the wheel rim, a plurality of spoke units interconnecting the hub and the wheel rim. Left and right spoke-covering members are mounted respectively on left and right ends of the hub and abutting against and cooperating with each other to confine a spoke-receiving space for receiving the spoke units Each of the spoke-covering members has a central portion extending radially from the hub, and a plurality of equi-angularly spaced apart blade portions extending radially from the central portion of each of the left and right spoke-covering members to the wheel rim. A fastener fastens the spoke-covering members to prevent removal of the same from the hub and the wheel rim.

4 Claims, 6 Drawing Sheets

WHEEL ASSEMBLY WITH SPOKE-COVERING MEMBERS

BACKGROUND OF THE INVENTION

1. Field of the Invention

The present invention relates to a wheel assembly, more particularly to a bicycle wheel assembly with spoke-covering members.

2. Description of the Related Art

A conventional bicycle wheel assembly includes a wheel rim defining a rotation axis, a hub extending along the rotation axis and radially spaced apart from the wheel rim, and a plurality of spokes having inner ends fixed on the hub and outer ends fixed to the wheel rim, thereby interconnecting the hub and the wheel rim.

The conventional wheel assembly is disadvantageous in that injury is possible in case the user accidentally touch the spokes when the wheel assembly is in motion.

SUMMARY OF THE INVENTION

Therefore, the object of this invention is to provide a bicycle wheel assembly with spoke-covering members so as to avoid the undesired occurrence of the prior art.

Accordingly, a wheel assembly of the present invention includes: a wheel rim defining a rotation axis; a hub extending along said rotation axis, and radially spaced apart from said wheel rim, and having opposite left and right ends; a plurality of equi-angularly spaced apart spoke units interconnecting the hub and the wheel rim; complementary left and right spoke-covering members mounted respectively on the left and right ends of the hub and abutting against and cooperating with each other to confine a spoke-receiving space therebetween for receiving the spoke units, each of the left and right spoke-covering members having a central portion extending radially from the hub, and a plurality of equi-angularly spaced apart blade portions extending radially from the central portion to the wheel rim, each of the blade portions of the left spoke-covering member abutting against and cooperating with a respective one of the blade portions of the right spoke-covering member to confine a portion of the spoke-receiving space, each of the spoke units extending from the hub into the portion of the spoke-receiving space between a respective one of the blade portions of the left spoke-covering member and a respective one of the blade portions of the right spoke-covering member; and a fastener unit for fastening the left and right spoke-covering members together so as to prevent removal of the same from the wheel rim and the hub.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
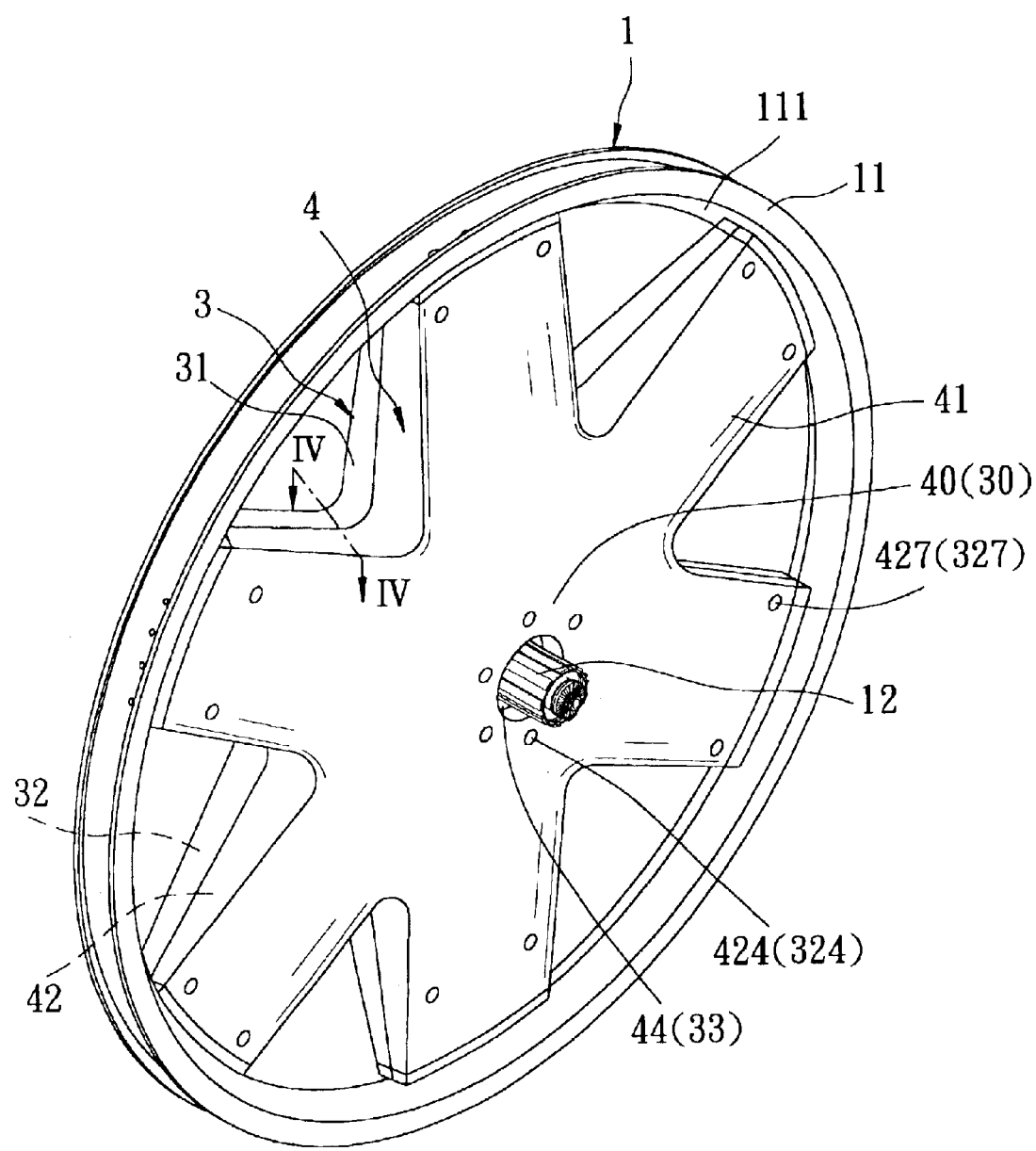
FIG. 1 is a perspective view of a first preferred embodiment of a wheel assembly according to the present invention.
Figure 2:
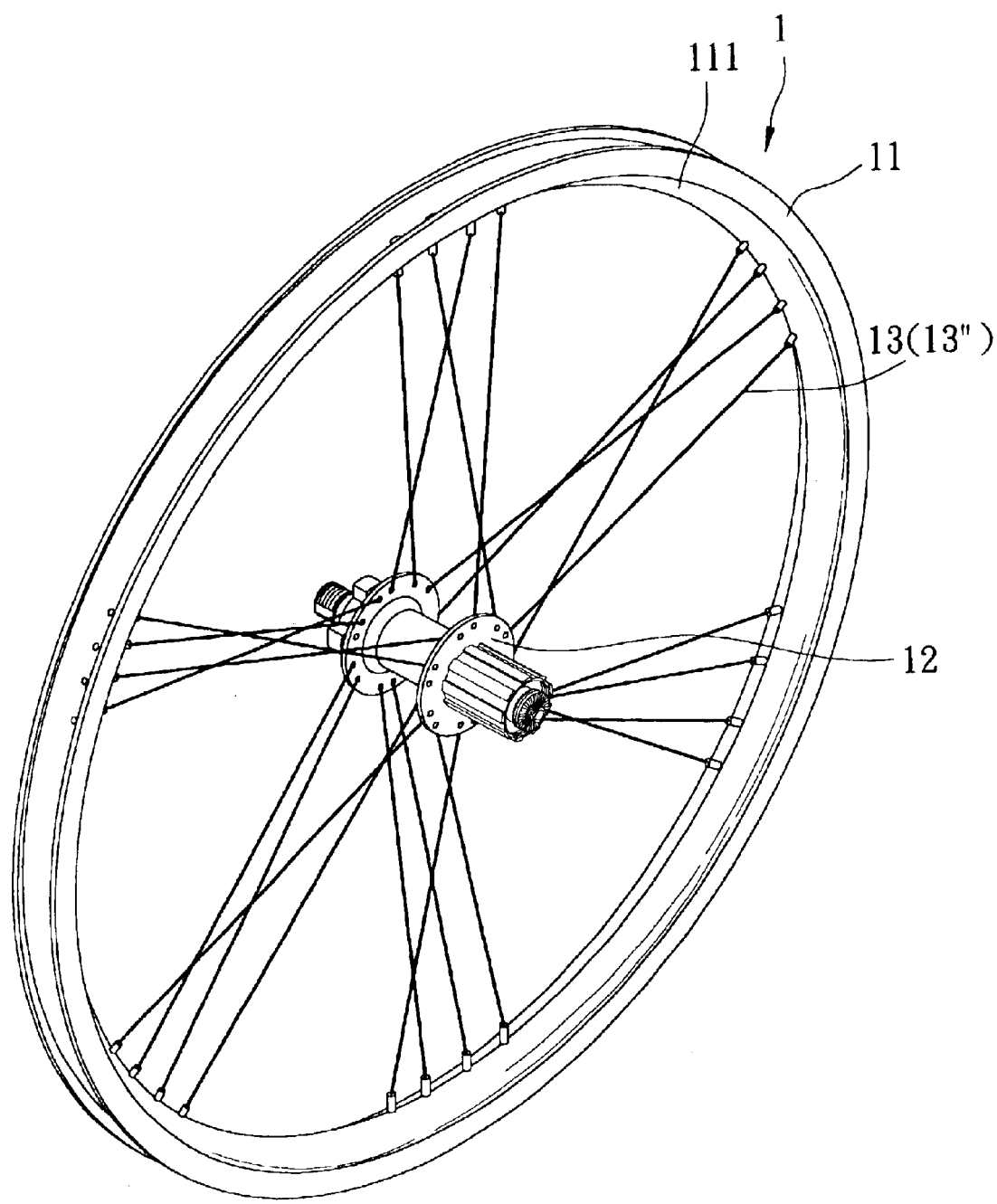
FIG. 2 is a perspective view of the first preferred embodiment, with left and right spoke-covering members removed therefrom.
Figure 3:
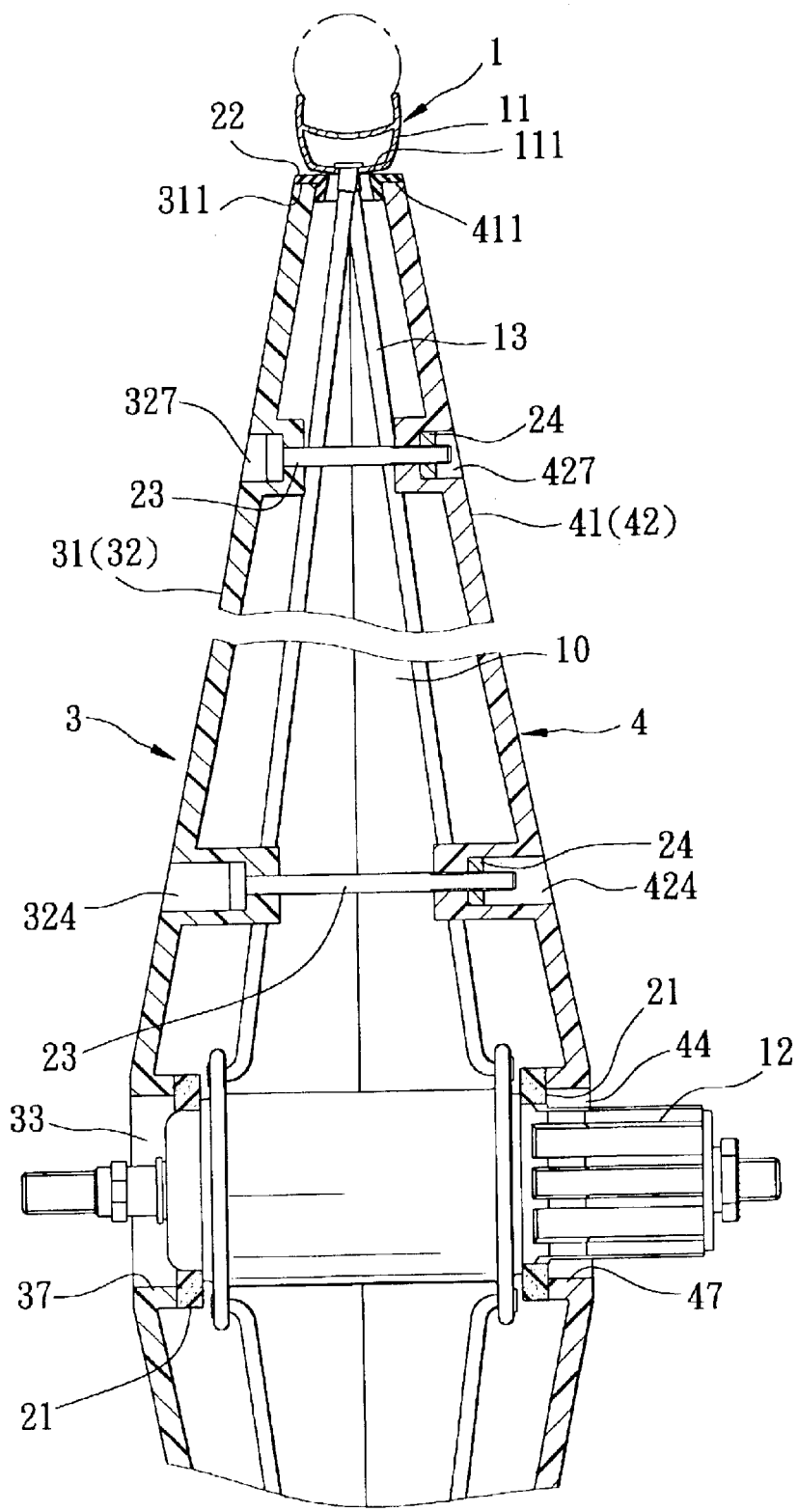
FIG. 3 is a fragmentary sectional view of the first preferred embodiment, illustrating how the left and right spoke-covering members are fastened together.

Referring to FIGS. 1 to 3, the first preferred embodiment of a bicycle wheel assembly according to the present invention is shown to include a metal wheel rim 1, a hub 12, a plurality of equi-angularly spaced apart spoke unit 13, complementary left and right spoke-covering members 3, 4, and a fastener unit.

As illustrated, the wheel rim 1 defines a rotation axis, and has an annular spoke-mounting wall 111, and left and right tire-retention flanges 11 extending radially and outwardly from two opposite sides of the spoke-mounting wall 111 to receive a tire (shown by dotted lines in FIG. 3) therebetween.

The hub 12 extends along the rotation axis, is radially spaced apart from the spoke-mounting wall 111 of the wheel rim 1, and has opposite left and right ends.

The spoke units 13 interconnect the hub 12 and the spoke-mounting wall 111 of the wheel rim 1 in a conventional manner.

The left and right spoke-covering members 3, 4, which are made of plastic material, are mounted respectively on the left and right ends of the hub 12, and abut against and cooperate with each other to confine a spoke-receiving space 10 therebetween for receiving the spoke units 13. Each of the left and right spoke-covering members 3, 4 has a central portion 30, 40 extending radially from the hub 12, and a plurality of equi-angularly spaced apart blade portions 31, 41 extending radially from the central portion 30, 40 to the wheel rim 1. Each of the blade portions 31 of the left spoke-covering member 3 abuts against and cooperates with a respective one of the blade portions 41 of the right spoke-covering member 4 to confine a portion 32+42 of the spoke-receiving space 10. Each of the spoke units 13 extends from the hub 12 into the portion 32+42 of the spoke-receiving space 10 between a respective one of the blade portions 31 of the left spoke-covering member 3 and a respective one of the blade portions 41 of the right spoke-covering member 4.

The fastener unit fastens the left and right spoke-covering members 3, 4 together so as to prevent removal of the same from the wheel rim 1 and the hub 12.

The central portion 30, 40 of each of the left and right spoke-covering members 3, 4 is formed with a through hole 33, 44 to permit extension of a respective one of the left and right ends of the hub 12. The central portion 30, 40 of each of the left and right spoke-covering members 3, 4 is further formed with a plurality of equi-angularly spaced apart first retaining recesses 324, 424 around the through hole 33, 44. The blade portions 31, 41 of each of the left and right spoke-covering members 3, 4 are formed with a plurality of equi-angularly spaced apart second retaining recesses 327, 427. The fastener unit includes first screw means 23, 24 that extend through the first retaining recesses 324, 424 in the central portions 30, 40 of the left and right spoke-covering members 3, 4, and second screw means 23, 24 that extend through the second retaining recesses 327, 427 in the blade portions 31, 41 of the left and right spoke-covering members 3, 4. Preferably, a pair of shock-absorbing rubber sleeves 21 are sleeved respectively around the left and right ends of the hub 12 to abut against two inwardly and axially extending flanges 37, 47 of the central portions 30, 40 of the left and right spoke-covering members 3, 4, respectively. This invention further includes a plurality of L-shaped rubber sleeves 22, each of which is sleeved on a distal end 311, 411 of a respective one of the blade portions 31, 41 of the left and right spoke-covering members 3, 4, and each of which abuts against the spoke-mounting wall 111 of the wheel rim 1 to absorb vibrations resulting from rotation of the wheel assembly.

Figure 4:
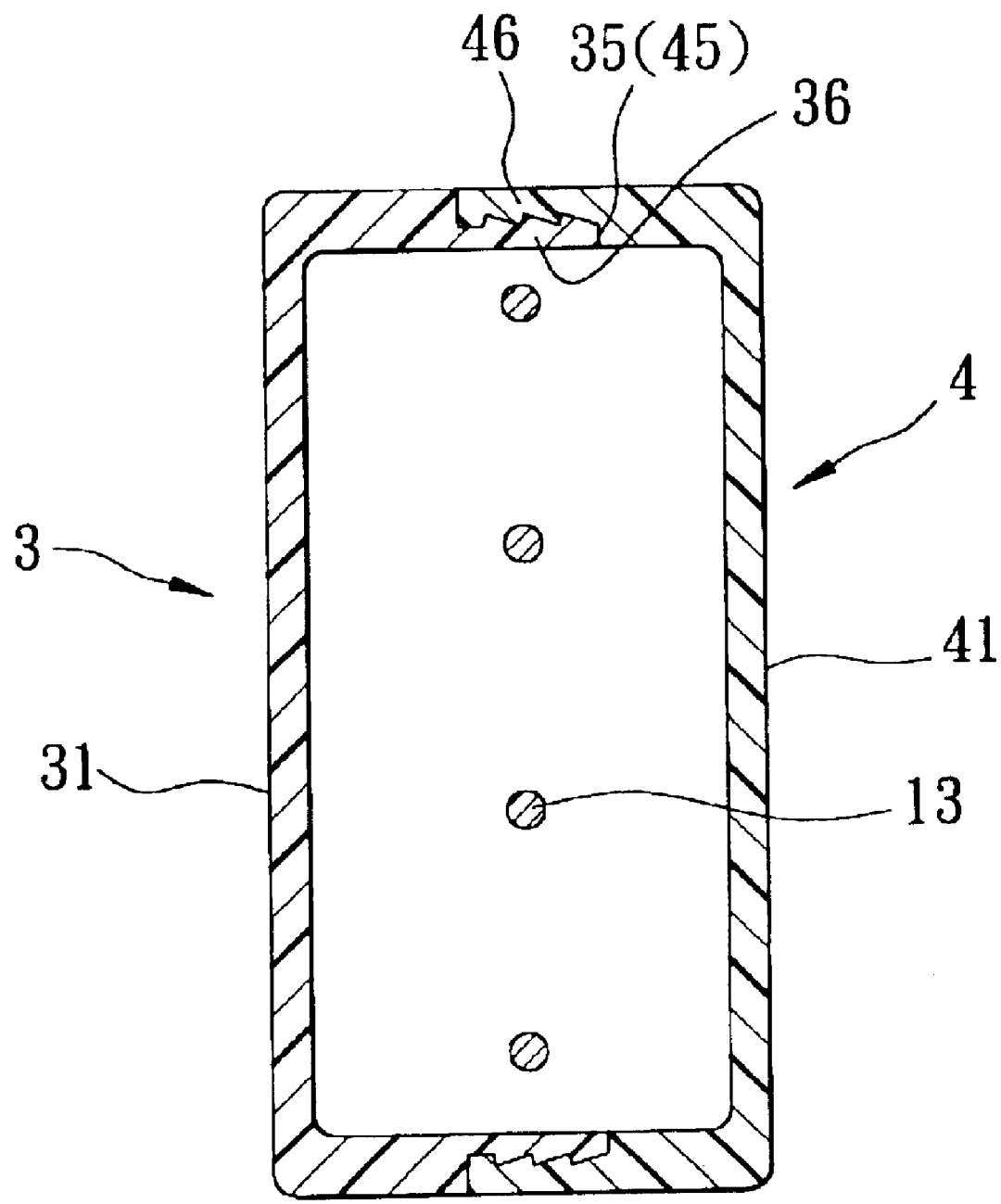
FIG. 4 is a sectional view of the first preferred embodiment taken along lines IV—IV of FIG. 1.

Referring to FIG. 4, in the first preferred embodiment, each of the blade portions 31, 41 of the left and right spoke-covering members 3, 4 has a U-shaped cross-section, and includes two opposite arms 36, 46 extending toward a respective one of the spoke units 13 and having toothed distal ends 35, 45. The toothed distal ends 35 of the opposite arms 36 of each of the blade portions 31 of the left spoke-covering member 3 are in interference fit with the toothed distal ends 45 of the opposite arms 46 of a respective one of the blade portions 41 of the right spoke-covering member 4 so as to enhance engagement between the left and right spoke-covering members 3, 4 upon tightening of the first and second screw means 23, 24 in the first and second retaining recesses 324, 424, 327, 427 of the left and right spoke-covering members 3, 4.

Figure 5:
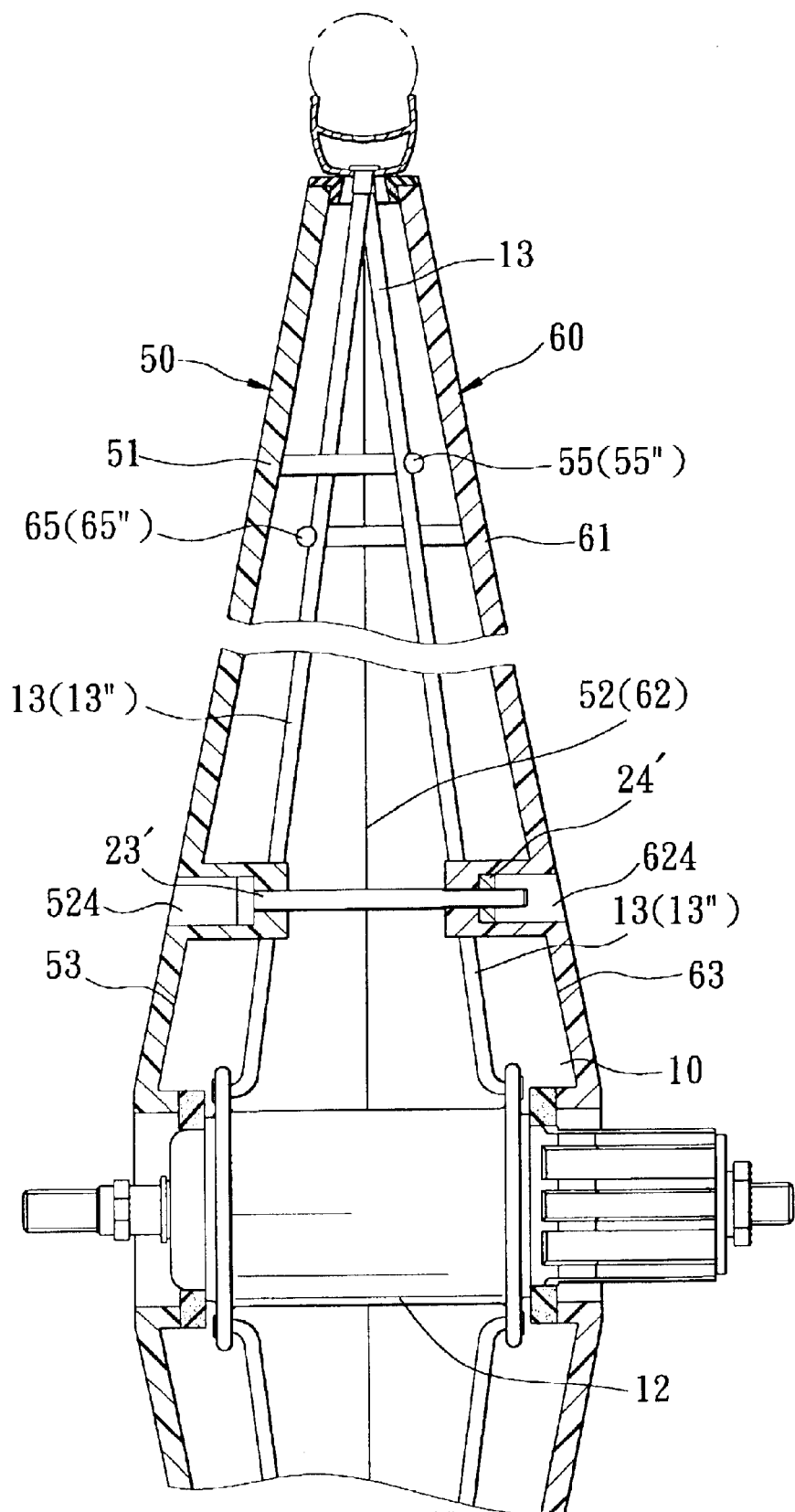
FIG. 5 is a fragmentary sectional view of a second preferred embodiment of a wheel assembly according to the present invention, illustrating how left and right spoke-covering members are fastened together.

Referring to FIG. 5, a second preferred embodiment of a wheel assembly according to the present invention is shown to have a construction similar to that of the first preferred embodiment. The main difference resides in that the central portion 53, 63 of each of the left and right spoke-covering members 50, 60 is formed with a plurality of equi-angularly spaced apart retaining recesses 524, 624. Each of the spoke units 13 includes a plurality of spokes 13". The fastener unit includes screw means 23', 24' that extend through the retaining recesses 524, 624 in the central portions 53, 63 of the left and right spoke-covering members 50, 60, and a plurality of hook members 55, 65 extending from the blade portions 51, 61 of the left and right spoke-covering members 50, 60 into the spoke-receiving space 10, and having hook ends 55", 65", each of which hooks up an adjacent one of the spokes 13".

Figure 6:
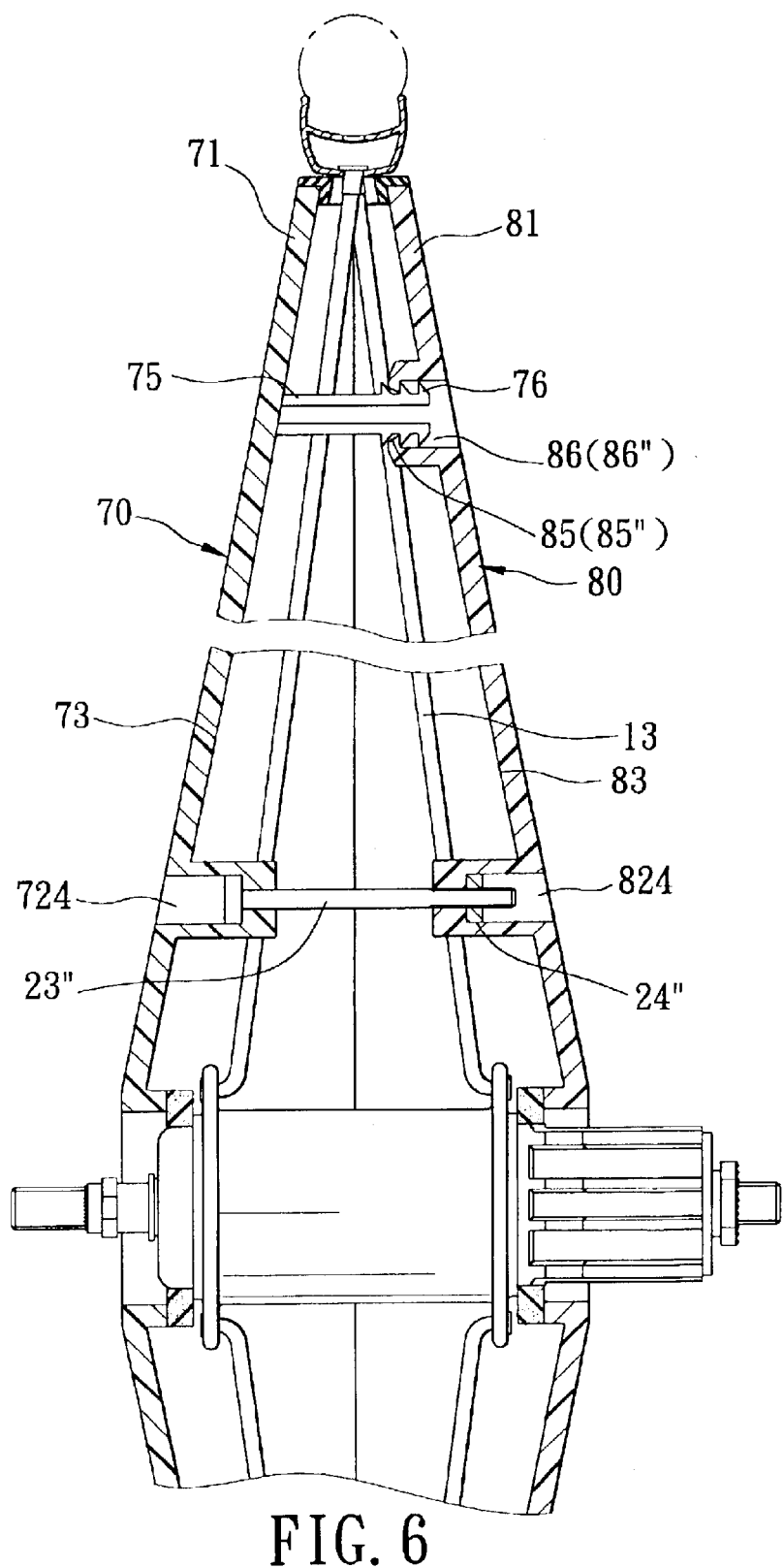
FIG. 6 is a fragmentary sectional view of a third preferred embodiment of a wheel assembly according to the present invention, illustrating how left and right spoke-covering members are fastened together.

Referring to FIG. 6, a third preferred embodiment of a wheel assembly according to the present invention is shown to have a construction similar to that of the first preferred embodiment. The main difference resides in that the central portion 73, 83 of each of the left and right spoke-covering members 70, 80 is formed with a plurality of equi-angularly spaced apart retaining recesses 724, 824. Each of the blade portions 81 of the right spoke-covering member 80 is formed with an anchoring recess 86 which is confined by a recess-confining wall 86". The recess-confining wall 86" has a bight portion 85 formed with a through-hole 85". The fastener unit includes screw means 23", 24" that extend through the retaining recesses 724, 824 in the central portions 73, 83 of the left and right spoke-covering members 70, 80, and a plurality anchoring members 75 extending respectively from the blade portions 71 of the left spoke-covering member 70 through the through-holes 85" in the anchoring recesses 86 in the blade portions 81 of the right spoke-covering member 80. Each of the anchoring members 75 has an anchor end 76 anchoring a periphery of the through hole 85" in the bight portion 85 in a respective one of the anchoring recesses 86, thereby preventing removal of the anchoring members 75 from the anchoring recesses 86.

With this invention thus explained, it is apparent that numerous modifications and variations can be made without departing from the scope and spirit of this invention. It is therefore intended that the invention be limited only as indicated in the appended claims.

I claim:

1. A wheel assembly, comprising:

a wheel rim defining a rotation axis;

a hub extending along said rotation axis, radially spaced apart from said wheel rim, and having opposite left and right ends;

a plurality of equi-angularly spaced apart spoke units interconnecting said hub and said wheel rim;

complementary left and right spoke-covering members mounted respectively on said left and right ends of said hub and abutting against and cooperating with each other to confine a spoke-receiving space therebetween for receiving said spoke units, each of said left and right spoke-covering members having a central portion extending radially from said hub, and a plurality of equi-angularly spaced apart blade portions extending radially from said central portion to said wheel rim, each of said blade portions of said left spoke-covering member abutting against and cooperating with a respective one of said blade portions of said right spoke-covering member to confine a portion of said spoke-receiving space, each of said spoke units extending from said hub into said portion of said spoke-receiving space between a respective one of said blade portions of said left spoke-covering member and a respective one of said blade portions of said right spoke-covering member; and a fastener unit for fastening said left and right spoke-covering members together so as to prevent removal of the same from said wheel rim and said hub, wherein said central portion of each of said left and right spoke-covering members is formed with a plurality of equi-angularly spaced apart first retaining recesses, said blade portions of each of said left and right spoke-covering members being formed with a plurality of equi-angularly spaced apart second retaining recesses, said fastener unit including first screw means that extend through said first retaining recesses in said central portions of said left and right spoke-covering members, and second screw means that extend through said second retaining recesses in said blade portions of said left and right spoke-covering members.

2. A wheel assembly, comprising:

a wheel rim defining a rotation axis;

a hub extending along said rotation axis, radially spaced apart from said wheel rim, and having opposite left and right ends;

a plurality of equi-angularly spaced apart spoke units interconnecting said hub and said wheel rim;

complementary left and right spoke-covering members mounted respectively on said left and right ends of said hub and abutting against and cooperating with each other to confine a spoke-receiving space therebetween for receiving said spoke units, each of said left and right spoke-covering members having a central portion extending radially from said hub, and a plurality of equi-angularly spaced apart blade portions extending radially from said central portion to said wheel rim, each of said blade portions of said left spoke-covering member abutting against and cooperating with a respective one of said blade portions of said right spoke-covering member to confine a portion of said spoke-receiving space, each of said spoke units extending from said hub into said portion of said spoke-receiving space between a respective one of said blade portions of said left spoke-covering member and a respective one of said blade portions of said right spoke-covering member; and a fastener unit for fastening said left and right spoke-covering members together so as to prevent removal of the same from said wheel rim and said hub, wherein each of said blade portions of said left and right spoke-covering members has an U-shaped cross-section, and includes two opposite arms extending toward a respective one of said spoke units and having toothed distal ends, said toothed distal ends of said opposite arms of each of said blade portions of said left spoke-covering member being in interference fit with said toothed distal ends of said opposite arms of a respective one of said blade portions of said right spoke-covering member so as to enhance engagement between said left and right spoke-covering members upon tightening of said first and second screw means in said first and second retaining recesses.

3. A wheel assembly, comprising:

a wheel rim defining a rotation axis;

a hub extending alone said rotation axis, radially spaced apart from said wheel rim, and having opposite left and right ends;

a plurality of equi-angularly spaced apart spoke units interconnecting said hub and said wheel rim;

complementary left and right spoke-covering members mounted respectively on said left and right ends of said hub and abutting against and cooperating with each other to confine a spoke-receiving space therebetween for receiving said spoke units, each of said left and right spoke-covering members having a central portion extending radially from said hub, and a plurality of equi-angularly spaced apart blade portions extending radially from said central portion to said wheel rim, each of said blade portions of said left spoke-covering member abutting against and cooperating with a respective one of said blade portions of said right spoke-covering member to confine a portion of said spoke-receiving space, each of said spoke units extending from said hub into said portion of said spoke-receiving space between a respective one of said blade portions of said left spoke-covering member and a respective one of said blade portions of said right spoke-covering member; and a fastener unit for fastening said left and right spoke-covering members together so as to prevent removal of the same from said wheel rim and said hub, wherein said central portion of each of said left and right spoke-covering members is formed with a plurality of equi-angularly spaced apart retaining recesses, each of said spoke units including a plurality of spokes, said fastener unit including screw means that extend through said retaining recesses in said central portions of said left and right spoke-covering members, and a plurality of hook members extending respectively from said blade portions of said left and right spoke-covering members into said spoke-receiving space and having hook ends, each of which hooks an adjacent one of said spokes.

4. A wheel assembly, comprising:

a wheel rim defining a rotation axis;

a hub extending along said rotation axis, radially spaced apart from said wheel rim, and having opposite left and right ends;

a plurality of equi-angularly spaced apart spoke units interconnecting said hub and said wheel rim;

complementary left and right spoke-covering members mounted respectively on said left and right ends of said hub and abutting against and cooperating with each other to confine a spoke-receiving space therebetween for receiving said spoke units, each of said left and right spoke-covering members having a central portion extending radially from said hub, and a plurality of equi-angularly spaced apart blade portions extending radially from said central portion to said wheel rim, each of said blade portions of said left spoke-covering member abutting against and cooperating with a respective one of said blade portions of said right spoke-covering member to confine a portion of said spoke-receiving space, each of said spoke units extending from said hub into said portion of said spoke-receiving space between a respective one of said blade portions of said left spoke-covering member and a respective one of said blade portions of said right spoke-covering member; and a fastener unit for fastening said left and right spoke-covering members together so as to prevent removal of the same from said wheel rim and said hub, wherein said central portion of each of said left and right spoke-covering members is formed with a plurality of equi-angularly spaced apart retaining recesses, each of said blade portions of said right spoke-covering member being formed with an anchoring recess which is confined by a recess-confining wall, said recess-confining wall having a bight portion formed with a through-hole, said fastener unit including screw means that extend respectively through said retaining recesses in said central portions of said left and right spoke-covering members, and a plurality of anchoring members extending respectively from said blade portions of said left spoke-covering member through said through holes in said anchoring recesses in said blade portions of said right spoke-covering member, each of said anchoring members having an anchor end anchoring a periphery of said through-hole in said bight portion of a respective one of said anchoring recesses, thereby preventing removal of said anchoring members from said anchoring recesses.

* * * * *